No. 868,038. PATENTED OCT. 15, 1907.
J. U. DE UHERKOCZ.
MECHANISM FOR WINGED FLYING MACHINES OR AIR SHIPS.
APPLICATION FILED APR. 3, 1907.
3 SHEETS—SHEET 1.
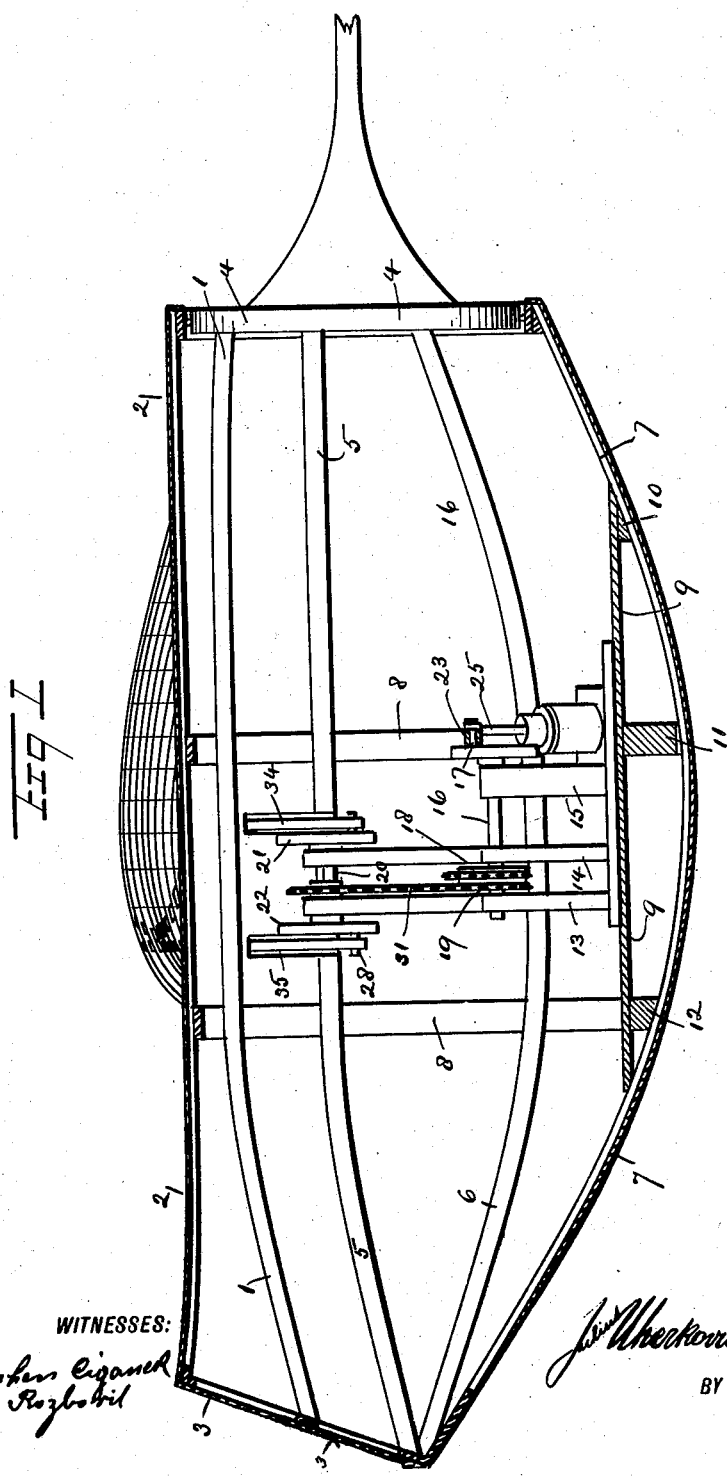
WITNESSES:
INVENTOR
BY
ATTORNEY No. 868,038. PATENTED OCT. 15, 1907.
J. U. DE UHERKOCZ.
MECHANISM FOR WINGED FLYING MACHINES OR AIR SHIPS.
APPLICATION FILED APR. 3, 1907.
3 SHEETS—SHEET 2.
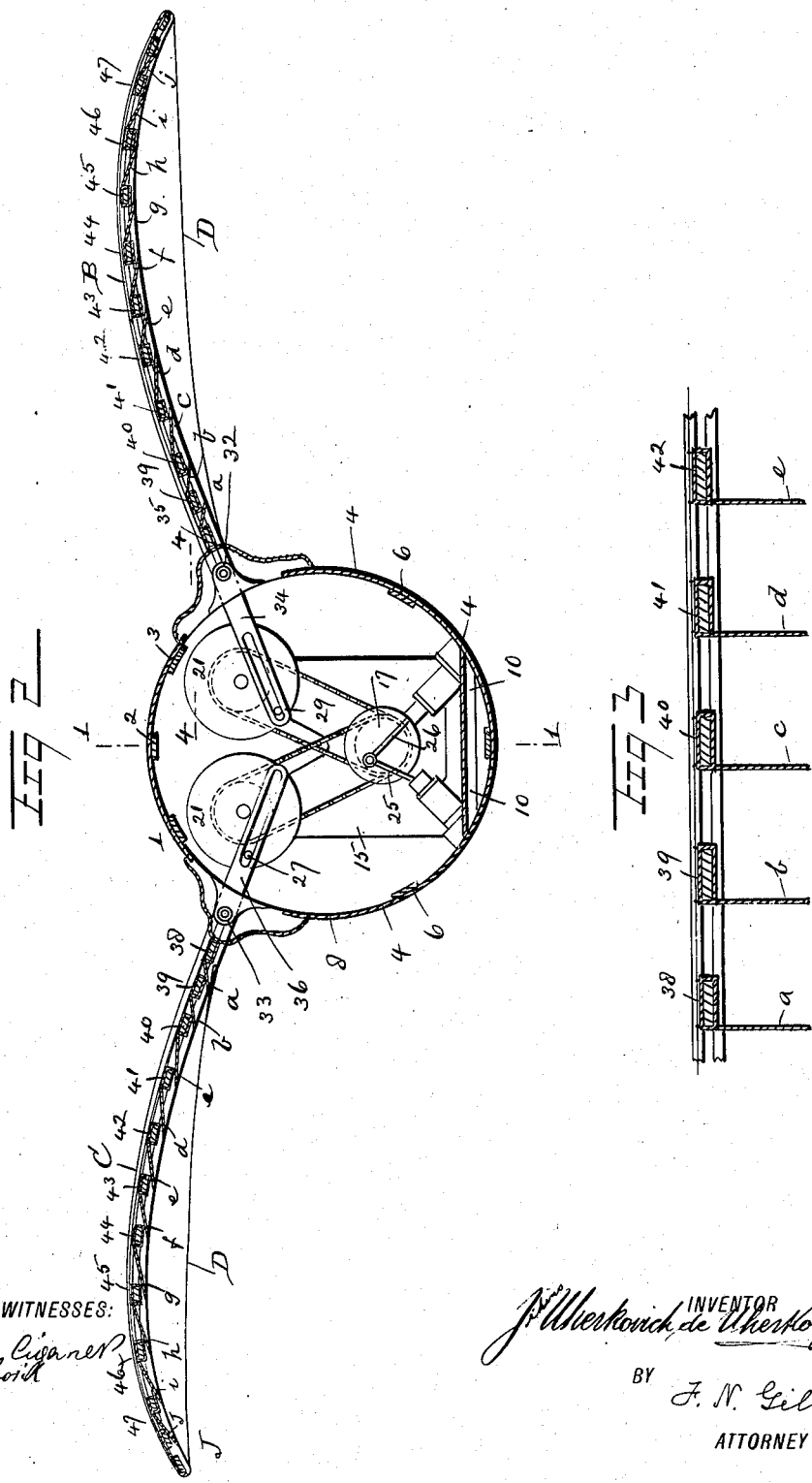
WITNESSES:
INVENTOR
BY
ATTORNEY

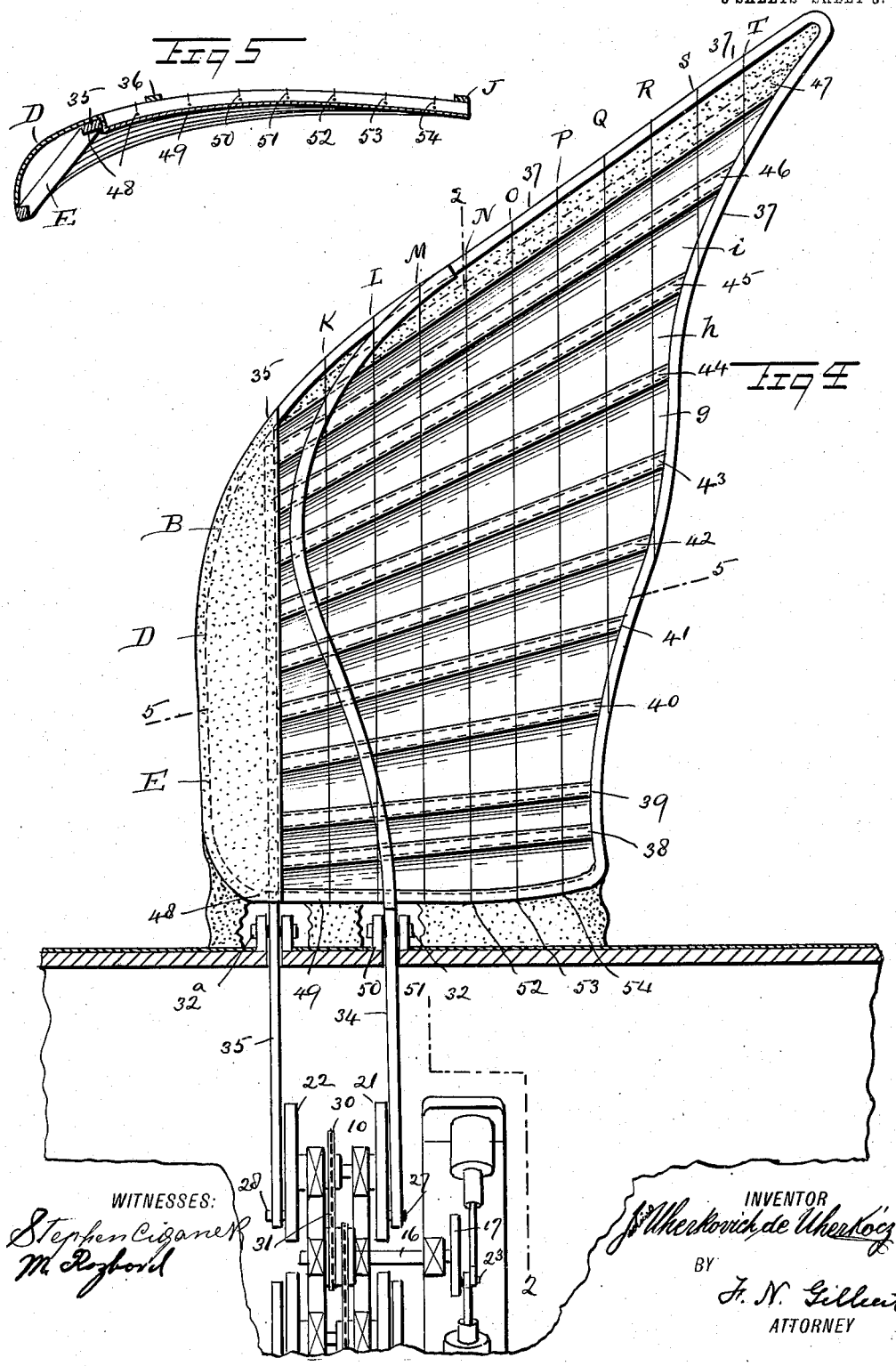

UNITED STATES PATENT OFFICE.

JULIUS UHERKOVICH DE UHERKÓCZ, OF BINGHAMTON, NEW YORK.

MECHANISM FOR WINGED FLYING-MACHINES OR AIR-SHIPS.

No. 868,038. Specification of Letters Patent. Patented Oct. 15, 1907.

Application filed April 3, 1907. Serial No. 366,103.

*To all whom it may concern:*

Be it known that I, JULIUS UHERKOVICH DE UHERKÓCZ, a citizen of the United States, residing at Binghamton, in the county of Broome and State of New York, have invented certain new and useful Improvements in Propelling Mechanism for Winged Flying-Machines or Air-Ships, of which the following is a specification.

My invention relates to improvements in the propelling mechanism of flying machines or air ships, more particularly to what is known as winged flying machines or machines sustained in the air by the power of flapping or moving wings.

My invention is composed of a novel ribbed body frame to which are attached two or more wings, one or more on each side of the body (although in the machine hereinafter described I use but one wing on each side), which wings operate on an axis attached to or connecting with the sides of the framed body; the wings being vibrated up and down by means of two slotted levers attached to each wing and operating upon a single shaft connecting with the frame-work of the wings, the said levers being in turn operated by mechanical motive power within the body. The wing structures are comprised of a series of extended ribs attached to a projecting frame and the extended slotted lever-bars mentioned, and to which ribs are attached a series of flexible blades, one blade to each rib and each blade held rigid on the one side while flexibly opening on the other. So that while the wing is being raised by an upward movement the opening blades enables it to offer the least resistance to the air but when lowered the blades are closed by the pressure of the air and present a compact surface against the air and thus pressed they receive a buoyant or lifting power from the air aiding and assisting the body in the air.

The object of my invention is to provide machines which in their sustaining powers shall in all respects imitate as far as possible a bird in its flight and in the movement of its wings. The body has in the rear an extended projection, fan-shaped in form, which in imitation of the bird aids the wings in sustaining the equilibrium of the body when in the air and in guiding the direction of the moving body.

With this and other objects in view, the invention comprises certain novel constructions, combinations and arrangements of parts as will be hereinafter fully described and claimed.

Figure 1 is a longitudinal section taken on line 1. 1. of Fig. 2. Fig. 2 is a cross-section taken on line 2. 2. of Fig. 1. Fig. 3 is a detailed cross-section of the blades in their open position. Fig. 4 is a sectional plan-view taken on line 4. 4. of Fig. 5. Fig. 5 is a cross-section taken on line 5. 5. of Fig. 4.

In the construction and operation of my invention I have a framed body portion represented in Fig.1, which is formed of a framed structure shown in Figs. 1 and 2, circular in form as shown in the cross section in Fig. 2, the frame work having a level top on the lines shown by ribs 2. 2. as shown in Figs. 1 and 2 and while the body portion is flat at the top as shown in Figs. 1 and 2, yet the ribs forming the bottom are curved as shown in Fig. 1 by the ribs 7. 7.

The forward end of the body portion of my machine I may term the prow and which has the stiffening brace-beam 3. 3. as shown in Fig. 1, while to develop the elongated circular form of the body portion, the lines of the frame gradually curve from the prow until they meet the circular rib 4. 4. 4., forming the stern of the body portion as shown in Figs. 1 and 2.

From the forward stiffening brace 3. 3., extend the rib-braces 1. 1., 5. 5., 6. 6. and 7. 7. as shown in Figs. 1 and 2. These ribs are contoured in curved form as shown by ribs 7. 7. in Fig. 1. To further develop the curved body portion I place within the same, the curved ribs 8. 8. as shown in Figs. 1 and 2. This curved body portion, while being strengthened by these ribs, yet from its form it offers the least opposition to the air and enables the body to glide more easily through it.

Within the body portion I construct the platform represented in 9. 9. of Fig. 1, which rests upon the cross-ribs or cross-beams 10, 11 and 12 as shown in Figs. 1 and 2. Upon this platform I mount my motive power for propelling this machine and which may be any form of engine or mechanism which is best suited to furnish proper power to move the wings of the body portion under all general conditions. On this body portion I construct the shafting supports 13, 14 and 15 as shown in Figs. 1 and 2,—shaft 16 is revolved by the disk 17 and actuates sprocket wheels 18 and 19; also the shaft 20 actuated by the sprocket chain revolves the disks 21 and 22.

Mounted on disk 17 is a crank-pin to which is connected piston rods 25 and 26 as shown in Figs. 1 and 2.

On the disks 21 and 22 are mounted crank-pins 27 and 28 as shown in Fig. 1, and crank-pin 29 as shown in Fig. 2; revolving crank shaft 16 has upon it sprocket wheels 18 and 19 and on shaft 20 is the sprocket wheels 30.

The crank shaft 16 is geared to the shaft 20 by means of the sprocket gearing and the sprocket chains 31 extending from the sprocket wheels 19 to 30; hence when the crank shaft 16 revolves, turned by the movement of the piston-crank 25, acting on disk-pin 23, the sprocket wheels on shaft 16 revolve and turn the sprocket crank-shafts 20. In this way the disks 21 and 22 are caused to revolve with a rapid movement and in this manner I form a simple compact gearing strong and durable for the purposes desired.

To the sides of the body portion are hinged the wing frames B. and C. as shown in Figs. 2 and 4. These winged frames are hinged upon axes 32 and 33 as shown in Fig. 2. The wing frames extend into the interior of the body portion A. as shown in Figs. 2 and 4. This extension of the wing frame into the body portion A. is made by two lever arms, 34 and 35 as shown in Figs. 2 and 4, (34 and 35 representing the lever arms of the right wing as shown in Fig. 4), and by 36 as shown in Fig. 2, and are geared to the disks 21 and 22 by means of pins 27 and 28 as shown in Figs. 1 and 4 and 29 as shown in Fig. 2. Thus by means of the slotted gearing connecting the arms 34 and 35 with the revolving disks 27 and 28, the lever ends of the wings within the body are caused to move up and down as the disks are turned by the motive power within the body and cause the flapping movement of the winged structure of my invention. The arms 34 and 35 as shown in Fig. 4, extend outward from their axes 32 and 32. as shown in Fig. 4 and form the supporting part of the frame of the wing B., as shown in Fig. 4. The lever 35 extending out as shown in Fig. 4. forms the upper support of the wing slat hereinafter mentioned, while the lever arm 34 curving as shown in Fig. 4, forms the second support for the wing slats as hereinafter mentioned.

Outward from the lever arm 35 in the winged portion of my invention, as shown in Fig. 4, and joined to this arm are the winged slats 38 to 47. To each of these slats is attached a bending blade. These blades are designated by letters a, b, c, d, e, f, g, h, i, j, k, etc., as shown in Figs. 2, 3. The wing slats terminate in the curved outward rim 37, 37 as shown in Fig. 4. To these wing slats the blades are attached; the blades being constructed of any bending or yielding material, fastened to the slats as shown in Fig. 4, at the left hand side of the blade in the right wing, while they are fastened to the slat of the left wing on the right side of the blade as shown in Figs. 2 and 3, while the right hand edge of the blade is left free to open and bend. When the wing is raised the blades hinged upon the wing-slats, bend and open as shown in Fig. 3. They are opened by the upward motion of the wing against the air. These blades, a, b, c, d, e, etc., are open overlapping blades and while hinged on the one side of the wing slat, the other edge of the blade underlaps the next wing slat to it as shown in Fig. 2. When the wings are not in motion, the stiffness of the material holds the blade closed against the next wing-slat to it, as shown in Fig. 4. When the wing is raised the blades bend open as shown in Fig. 3. When the wing moves upward through the air again the slats are closed by the air current as shown in Figs. 2 and 4. By the bending and yielding of the blades in the upward movement of the wings, the wing is least retarded by the air while being raised and when bearing down again, in the downward movement the closed blades form a resistance to the air and so the wing receives the full lifting power of the air.

At point 48 as shown in Fig. 4, and united with the lever-arm 35, is the curved brace E., as shown in Fig. 5 which extends around and joins the lever arm as shown in Fig. 4. This curved frame piece from its point of connection with the lever arm 35, at the joint 48, as shown in Fig. 5, extends down in a diagonal direction from the curve as shown in Fig. 5. Over this curved frame work is fastened a covering of cloth or other suitable material, D., as shown in Figs. 4 and 5 and in this manner I construct the wing frame with the under curve as is shown in Fig. 5, to aid in gathering buoyancy and lifting power and propelling force to move the body upon the air.

Over the cross-ribs or slats of the wing frame a, b, c, d etc., are stretched the cords or wires K to T as shown in Fig. 4, the other ends of the wires being fastened to the wing frame at the points 45 to 57 and 58 as shown in Fig. 4. Thus by these cords or wires I strengthen the frame of the wing yet at the same time do not decrease its lightness.

The slotted lever arms 34 and 35 extending outside the body portion are curved to a gradual arch as shown in Fig. 2, and thus with their projecting ribs or slats, they form the curved surface or arch in imitation of a bird wing as shown in Fig. 2.

In the operation of the wings the motive power is turned on and connected with the crank-shaft 16 as shown in Fig. 1. It revolves the disks 21 and 22 causing the slotted levers to move up and down thus giving the frame extension outside the body portion, a movement up and down moving upon the axes 32 and 33 as shown in Fig. 2. In the upward movement of the wings the blades a, b, c, etc., are opened by the pressure of the air; thus their flight is not resisted, thereby accelerating their motion as shown in Fig. 3, while when moving downward the blades are closed as shown in Figs. 2 and 4. Thus the wings receive the full lifting power of the air which lifts the body portion. To further give buoyancy to the body portion and aid the lifting power of the wings, I cover the frame of the body portion with cloth or other suitable material.

Having thus fully described my invention what I claim as new and for which I desire Letters Patent, is as follows:—

1. An air ship comprising a rounded shell having a flat top and a bulging lower side, motive power therein, crank disks driven by said motive power, and wings journaled on opposite sides of the shell, said wings comprising each a pair of curved supporting levers having slotted inner ends for connection with the crank disks, slats secured to the levers, a frame surrounding the slats, braces between the slats, a covering to a portion of the wings, and flexible blades secured to the slats.

2. An air ship comprising a shell with suitable motive power therein, the shell being of rounded form with an angular pointed front end, a flat top and bulging lower side, steering gear located in the rear end of the shell, crank disks driven by said motive power, and wings journaled on opposite sides of the shell, said wings comprising each a pair of arched supporting levers having slotted inner ends for connection with the crank disks, spaced slats secured to the levers, and flexible blades secured to the slats, said blades having one edge secured to one slat and the opposite edge overlapping the next adjacent slat.

3. A wing for air ships comprising a pair of curved supporting levers having slotted inner ends, slats secured to the levers, a frame surrounding the slats, braces between the slats, a covering to the forward portion of the wing, and flexible blades each having one edge secured to one slat and having the opposite edge overlapping the next adjacent slat.

4. A wing for air ships comprising a pair of curved supporting levers having slotted inner ends, slats secured to the levers, a frame surrounding the slats, braces between the slats, a covering to the forward portion of the wing, flexible blades secured to the slats, power mechanism, and crank pins having driving connection with the slotted ends of the levers to vibrate the wings.

In testimony whereof I have affixed my signature, in presence of two witnesses.

JULIUS UHERKOVICH DE UHERKÓCZ.

Witnesses:
  MATT ROZBORIL,
  STEPHEN CIZANEK.